United States Patent
Hamaguchi et al.

(10) Patent No.: US 8,649,357 B2
(45) Date of Patent: Feb. 11, 2014

(54) WIRELESS COMMUNICATION SYSTEM, MOBILE STATION APPARATUS, BASE STATION APPARATUS AND WIRELESS COMMUNICATION METHOD

(75) Inventors: Yasuhiro Hamaguchi, Osaka (JP); Kazunari Yokomakura, Osaka (JP); Osamu Nakamura, Osaka (JP); Jungo Goto, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/265,747

(22) PCT Filed: Apr. 14, 2010

(86) PCT No.: PCT/JP2010/056688
§ 371 (c)(1),
(2), (4) Date: Dec. 1, 2011

(87) PCT Pub. No.: WO2010/122934
PCT Pub. Date: Oct. 28, 2010

(65) Prior Publication Data
US 2012/0063341 A1    Mar. 15, 2012

(30) Foreign Application Priority Data
Apr. 23, 2009 (JP) .................. 2009-105379

(51) Int. Cl.
*H04W 4/00* (2009.01)
*H04J 3/06* (2006.01)
*H04B 7/00* (2006.01)

(52) U.S. Cl.
USPC ............ 370/334; 370/350; 370/503; 455/522

(58) Field of Classification Search
USPC .......... 370/252, 310–350, 465–476, 503–523
See application file for complete search history.

(56) References Cited

U.S. PATENT DOCUMENTS

| 5,991,618 A | 11/1999 | Hall |
| 6,859,503 B2 | 2/2005 | Pautler et al. |

(Continued)

FOREIGN PATENT DOCUMENTS

| JP | 2005-509316 A | 4/2005 |
| JP | 2006-165641 A | 6/2006 |

(Continued)

OTHER PUBLICATIONS

Sharp, "System Level Performances of Non-contiguous RB assignment for LTE-Advanced Uplink," 3GPP TSG RAN WG1 Meeting #55bis, R1-090020, Ljubljana, Slovenia, Jan. 12-16, 2008.

(Continued)

*Primary Examiner* — Xavier Szewai Wong
(74) *Attorney, Agent, or Firm* — Birch, Stewart, Kolasch & Birch, LLP (57) ABSTRACT

To reduce power consumption in a mobile station apparatus in uplink, while making the system more efficient, the mobile station apparatus has a plurality of transmission antennas 7, performs wireless communications with a base station apparatus, and is provided with a PDCCH reception part 2 that receives designation information for designating the number of transmission antennas to use from the base station apparatus, a PH calculation part 5 that calculates PH (Power Headroom) indicative of a difference between maximum transmission power and transmission power required to achieve desired reception power in the base station apparatus, and a PUSCH transmission part 6 that transmits a signal including the PH to the base station apparatus using the number of transmission antennas designated by the designation information.

4 Claims, 3 Drawing Sheets

(56) References Cited

U.S. PATENT DOCUMENTS

| | | |
|---|---|---|
| 8,054,837 B2 | 11/2011 | Zhang et al. |
| 2003/0185309 A1 | 10/2003 | Pautler et al. |
| 2004/0162021 A1 | 8/2004 | Seki et al. |
| 2008/0008134 A1 | 1/2008 | Satou et al. |
| 2008/0095263 A1 | 4/2008 | Xu et al. |
| 2008/0267108 A1 | 10/2008 | Zhang et al. |
| 2009/0022239 A1 | 1/2009 | Kimura et al. |
| 2009/0257519 A1* | 10/2009 | Lin et al. ............ 375/260 |
| 2010/0027496 A1 | 2/2010 | Higuchi et al. |
| 2010/0098012 A1* | 4/2010 | Bala et al. ............ 370/329 |
| 2010/0173665 A1 | 7/2010 | Michel et al. |
| 2010/0211844 A1 | 8/2010 | Yuda et al. |
| 2010/0246561 A1* | 9/2010 | Shin et al. ............ 370/345 |
| 2011/0281525 A1* | 11/2011 | Furuskar et al. ............ 455/67.11 |
| 2012/0008583 A1 | 1/2012 | Zhang et al. |

FOREIGN PATENT DOCUMENTS

| | | |
|---|---|---|
| JP | 2008-17096 A | 1/2008 |
| JP | 2008-199423 A | 8/2008 |
| WO | WO 02/091625 A1 | 11/2002 |
| WO | 2006/129750 A1 | 12/2006 |
| WO | WO 2008/003087 A2 | 1/2008 |
| WO | WO 2008/155469 A1 | 12/2008 |
| WO | 2009/040678 A2 | 4/2009 |
| WO | 2009/041034 A1 | 4/2009 |

OTHER PUBLICATIONS

"3rd Generation Partnership Project; Technical Specification Group Radio Access Network; Further Advancements for E-UTRA Physical Layer Aspects (Release 9)", 3GPP TR 36.814, V0.4.1, Feb. 2009, 31 pages.

European Search Report issued in European Patent Application No. 10766991.3 on Mar. 18, 2013.

Panasonic, "System Performance of Uplink Non-contiguous Resource Allocation" 11.2, 3GPP TSG RAN WG1 Meeting #55, R1-084224, Prague, Czech Republic, Nov. 10-14, 2008.

3GPP TSG-RAN1 Meeting #48, St Louis, USA, Feb. 12-16, 2007, R1-070849, 3rd Generation Partnership Project; Technical Specification Group Radio Access Network; Physical layer; Measurements (TDD) (Release 7).

Nokia, 3GPP TSG RAN WG1 #52 Meeting, Sorrento, Italy, Feb. 11-15, 2008, R1-080947, Nokia Siemens Networks, Nokia Corporation, "Triggers for Power Headroom Reports in EUTRAN Uplink".

* cited by examiner

WIRELESS COMMUNICATION SYSTEM, MOBILE STATION APPARATUS, BASE STATION APPARATUS AND WIRELESS COMMUNICATION METHOD

TECHNICAL FIELD

The present invention relates to techniques for determining the number of transmission antennas of a communication apparatus having a plurality of transmission antennas.

BACKGROUND ART

Recently, standardization of the LTE (Long Term Evolution) system has been almost completed which is the 3.9G mobile telephone wireless communication system, and lately, standardization of LTE-A (LTE-Advance, also referred to as IMT-A) has been started which is the 4G wireless communication system that is further evolved from the LTE system. In the LTE system, with consideration given to power consumption in uplink, Single Carrier Frequency Division Multiple Access (SC-FDMA) is adopted, and the mobile station does not use a plurality of antennas concurrently to transmit data.

However, in the LTE-A system, in order to actualize large-capacity communications in uplink in mobile stations such as notebook PCs that handle data amounts of large size, it is determined to introduce MIMO (Multiple-Input Multiple-Output) techniques for multiplexing different pieces of data into the same time and same frequency using a plurality of transmission/reception antennas, and transmission diversity techniques for transmitting the same data using a plurality of transmission antennas in an attempt to improve the communication quality at cell edges (for example, Non-patent Document 1).

PRIOR ART DOCUMENT

Non-Patent Document

Non-patent Document 1: 3GPP TR 36.814

DISCLOSURE OF INVENTION

Problems to be Solved by the Invention

However, transmission using a plurality of transmission antennas requires amplifiers, D/A (Digital to Analog) converters and the like corresponding to the number of transmission antennas, and there is a problem that power consumption thereby extremely increases in mobile stations.

The present invention was made in view of such circumstances, and it is an object of the invention to provide a wireless communication system, mobile station apparatus, base station apparatus and wireless communication method for reducing power consumption in the mobile station apparatus in uplink, while enabling the system to be made more efficient.

Means for Solving the Problem (1) To attain the above-mentioned object, the present invention took measures as described below. In other words, a wireless communication system of the invention is a wireless communication system comprised of a first communication apparatus having a plurality of transmission antennas, and a second communication apparatus that receives a signal transmitted from the first communication apparatus, and is characterized in that the first communication apparatus or the second communication apparatus determines the number of transmission antennas used by the first communication apparatus to transmit a signal, corresponding to a parameter concerning transmission power.

Thus, the number of transmission antennas used by the first communication apparatus to transmit a signal is determined corresponding to a parameter concerning transmission power, and it is thereby possible to reduce power consumption in the first communication apparatus, and to make the system more efficient.

(2) Further, in the wireless communication system of the invention, it is a feature that the parameter concerning transmission power is a parameter indicative of distortion of a transmission amplifier provided in the first communication apparatus.

Thus, since the parameter concerning transmission power is a parameter indicative of distortion of a transmission amplifier provided in the first communication apparatus, the processing is simplified and speeded, and it is possible to reduce power consumption in the first communication apparatus, and to make the system more efficient.

(3) Furthermore, in the wireless communication system of the invention, it is another feature that the number of transmission antennas to use is increased as a value of the parameter indicative of distortion of the transmission amplifier deteriorates.

Thus, since the number of transmission antennas to use is increased as a value of the parameter indicative of distortion of the transmission amplifier deteriorates, it is possible to improve the reception power in the second communication apparatus and to reduce the error probability of data.

(4) Still furthermore, in the wireless communication system of the invention, when the first communication apparatus determines the number of transmission antennas, the first communication apparatus is characterized by transmitting a value different from a value of a parameter used in determining the number of transmission antennas to the second communication apparatus.

Thus, the first communication apparatus transmits a value different from a value of a parameter used in determining the number of transmission antennas to the second communication apparatus, and therefore, it is possible to avoid deterioration of throughput such as reductions in the data amount to assign in the second communication apparatus when the same value is transmitted.

(5) Moreover, a wireless communication system of the invention is a wireless communication system in which a first communication apparatus having a plurality of transmission antennas and a second communication apparatus select one communication scheme from among a plurality of communication schemes to perform communications, and is characterized in that the first communication apparatus or the second communication apparatus determines the number of transmission antennas and the communication scheme used by the first communication apparatus to transmit a signal, corresponding to a parameter concerning transmission power.

Thus, the number of transmission antennas and communication scheme used by the first communication apparatus to transmit a signal are determined corresponding to a parameter concerning transmission power, and it is thereby possible to reduce power consumption in the first communication apparatus, and to make the system more efficient.

(6) Further, in the wireless communication system of the invention, it is a feature that the first communication apparatus or the second communication apparatus determines a combination of the number of transmission antennas and the communication scheme that maximizes spectrum efficiency among selectable combinations of the number of transmission antennas and the communication scheme.

According to this constitution, it is possible to improve spectrum efficiency.

(7) Furthermore, in the wireless communication system of the invention, it is another feature that the first communication apparatus or the second communication apparatus determines a combination of the number of transmission antennas and the communication scheme that minimizes power consumption in the first communication apparatus among selectable combinations of the number of transmission antennas and the communication scheme.

According to this constitution, it is possible to reduce power consumption.

(8) Still furthermore, in the wireless communication system of the invention, when the first communication apparatus changes the number of transmission antennas to use, the first communication apparatus is characterized by transmitting known signals to measure channel states of a system band to the second communication apparatus from all transmission antennas being used, and then, changing the number of transmission antennas.

According to this constitution, it is possible to grasp channel states corresponding to the number of transmission antennas.

(9) Moreover, a mobile station apparatus of the invention is a mobile station apparatus which has a plurality of transmission antennas and performs wireless communications with a base station apparatus, and is characterized by having a reception part that receives designation information for designating the number of transmission antennas to use, a PH calculation part that calculates PH (Power Headroom) indicative of a difference between maximum transmission power and transmission power required to achieve desired reception power in the base station apparatus, and a mobile station-side transmission part that transmits a signal including the PH to the base station apparatus using the number of transmission antennas designated by the designation information.

According to this constitution, the base station apparatus is capable of determining the number of transmission antennas, and it is possible to reduce power consumption in the mobile station apparatus and to make the system more efficient.

(10) Further, a mobile station apparatus of the invention is a mobile station apparatus which has a plurality of transmission antennas and performs wireless communications with a base station apparatus, and is characterized by having a PH calculation part that calculates PH (Power Headroom) indicative of a difference between maximum transmission power and transmission power required to achieve desired reception power in the base station apparatus, a mobile station-side number-of-transmission-antenna determination part that determines the number of transmission antennas based on the calculated PH, and a mobile station-side transmission part that transmits a signal to the base station apparatus using the determined number of transmission antennas.

According to this constitution, the mobile station apparatus is capable of determining the number of transmission antennas, and it is possible to reduce power consumption in the mobile station apparatus and to make the system more efficient.

(11) Moreover, a base station apparatus of the invention is a base station apparatus that performs wireless communications with a mobile station apparatus having a plurality of transmission antennas, and is characterized by having a PH detection part that detects PH (Power Headroom), transmitted from the mobile station apparatus, indicative of a difference between maximum transmission power in the mobile station apparatus and transmission power required to achieve desired reception power, a base station-side number-of-transmission-antenna determination part that determines the number of transmission antennas used by the mobile station apparatus based on the detected PH, and a base station-side transmission part that transmits information indicative of the determined number of transmission antennas to the mobile station apparatus.

According to this constitution, the base station apparatus is capable of determining the number of transmission antennas, and it is possible to reduce power consumption in the mobile station apparatus and to make the system more efficient.

(12) Further, a wireless communication method of the invention is a wireless communication method in which a first communication apparatus having a plurality of transmission antennas and a second communication apparatus select one communication scheme from among a plurality of communication schemes to perform communications, and is characterized in that the first communication apparatus or the second communication apparatus determines the number of transmission antennas and the communication scheme used by the first communication apparatus to transmit a signal, corresponding to a parameter concerning transmission power.

Thus, the number of transmission antennas used by the first communication apparatus to transmit a signal is determined corresponding to a parameter concerning transmission power, and it is thereby possible to reduce power consumption in the first communication apparatus, and to make the system more efficient.

Advantageous Effect of the Invention

According to the invention, when transmission is performed using a plurality of transmission antennas, it is possible to determine the number of transmission antennas to use corresponding to the transmission power, and it is thereby possible to reduce power consumption in the mobile station apparatus in uplink, and make the system more efficient.

BEST MODE FOR CARRYING OUT THE INVENTION

Embodiments of the invention will be described below with reference to drawings. The Embodiments below are aimed at uplink in which power consumption is an issue, but the invention is not limited thereto. Further, the Embodiments below are predicated on the method using SC-FDMA and Clustered DFT-S-OFDM as a communication scheme, but the invention is also applicable to the case of controlling the number of antennas in other communication schemes such as OFDM.

DFT-S-OFDM is also referred to as DFT-Precoded OFDM, and SC-FDMA (or DFT-S-OFDM) is of the case of consecutively using an access unit in the frequency domain called a resource block (RB) (RB is comprised of a plurality of subcarriers), while Clustered DFT-S-OFDM is of the case of discretely using the access unit.

Generally, SC-FDMA is a scheme good in the PAPR (Peak to Average Power Ratio) performance, and Clustered DFT-S-OFDM is inferior in the performance to SC-FDMA. However, the PAPR performance is better than in normal OFDM. This PAPR may be replaced with a value of CM (Cubic Metric). In addition, in this description, the mobile station apparatus may be simply referred to as a mobile station, and the base station apparatus may be simply referred to as a base station.

Embodiment 1

As Embodiment 1, described is a method of controlling the number of transmission antennas corresponding to Power Headroom (PH) as a parameter concerning transmission power. The PH indicative of headroom of the transmission power of a mobile station is sometimes transmitted as part of data. This PH is a parameter concerning distortion of the transmission amplifier, and usually, when the value is "0" or less, it is considered that distortion occurs in a transmission signal. Generally, the mobile station compares the transmission power calculated according to a parameter requested from the base station with the maximum transmission power expected from characteristics of the amplifier, and transmits the data using the lower transmission power transmission power is also dependent on the communication scheme in addition to the performance of the amplifier, and even when the same amplifier is used, the need arises to set the maximum transmission power at a lower value in using a communication scheme poor in PAPR performance and CM performance.

The mobile station detects uplink frequency assignment information (that is information about which frequency within a system band is used, and in LTE DCI named format 0 is to notify of uplink information) from DCI (Downlink Control Information) included in the PDCCH (Physical Downlink Control CHannel) in downlink. Using the obtained frequency assignment information, data communications are performed using the channel called the PUSCH (Physical Uplink Shared Channel) in uplink. At this point, the mobile station notifies the base station of the PH using the PUSCH or the like, and for example, the PH is represented by from 40 dB to −23 dB in 1 dB steps with respect to the maximum transmission power. The number of transmission antennas is determined from a value of the PH. The following table shows the relationship between the PH and the number of antennas to use. In addition, it is assumed that the maximum number of transmittable antennas is four and that the PH is indicated by PH in one transmission antenna.

TABLE 1

| PH | >a | a~b | b~c | ≤c |
|---|---|---|---|---|
| The number of used antennas | 1 | 2 | 3 | 4 |

In the aforementioned table, the relationship of a>b>c holds. In other words, when the PH is a large value, positions of the base station and the mobile station are considered near, and in consideration of power consumption of the mobile station, the number of antennas is set at "1".

Meanwhile, when the PH is a small value, it is considered the base station and the mobile station are in a far position relationship, and by transmitting the same data from a plurality of antennas, it is possible to expect that the reception power in the base station is improved. Particularly, when the PH shows a negative value, since the reception power is insufficient, by transmitting the data from a plurality of antennas, it is possible to reduce the data erroneous probability.

In addition, when a plurality of antennas exists, by adopting communication schemes using transmission diversity of STBC (Space Time Block Code), SFBC (Space Frequency Block Code), precoding, etc., it is possible to further improve the communication performance. Further, when the mobile station determines transmission antennas from the PH independently of the base station, the mobile station may increase or decrease the total number of transmission antennas simply, or may use schemes such as CDD (Cyclic Delay Diversity) without the need for estimating channels independently. The schemes of CDD, etc. have also a merit that it is not necessary to increase the number of SRSs (Sounding Reference Signals) that are signals to estimate rough quality of the communication band.

"a", "b" and "c" in the above-mentioned table are values determined in system design, and when transmission diversity gain is not considered, by setting that a=0, b=−3, c=−4.77, it is possible to prevent the average reception power from being insufficient at the base station end up to PH=−6. Further, when transmission diversity gain is considered, by subtracting the transmission diversity gain from b and c, it is possible to prevent the average reception power from being insufficient at the base station end.

Meanwhile, when the mobile station sets the number of antennas independently, it is better to control the PH to notify the base station and the PH to calculate the number of antennas as different values. When the PH in the case of a single transmission antenna is used as the PH, in the case where the number of antennas to use increases, although the PH is actually improved, the PH to notify is kept at a poor value. This is because the same effect as the maximum transmission power Pmax increasing is produced by using a plurality of antennas. At this point, deterioration in throughput occurs such as reductions in the data amount to assign, depending on control of the base station. Accordingly, as the PH to notify the base station, by notifying of the PH with consideration given to the number of antennas to use or dummy PH beforehand designed in the system, it is possible to prevent the deterioration.

Figure 1:
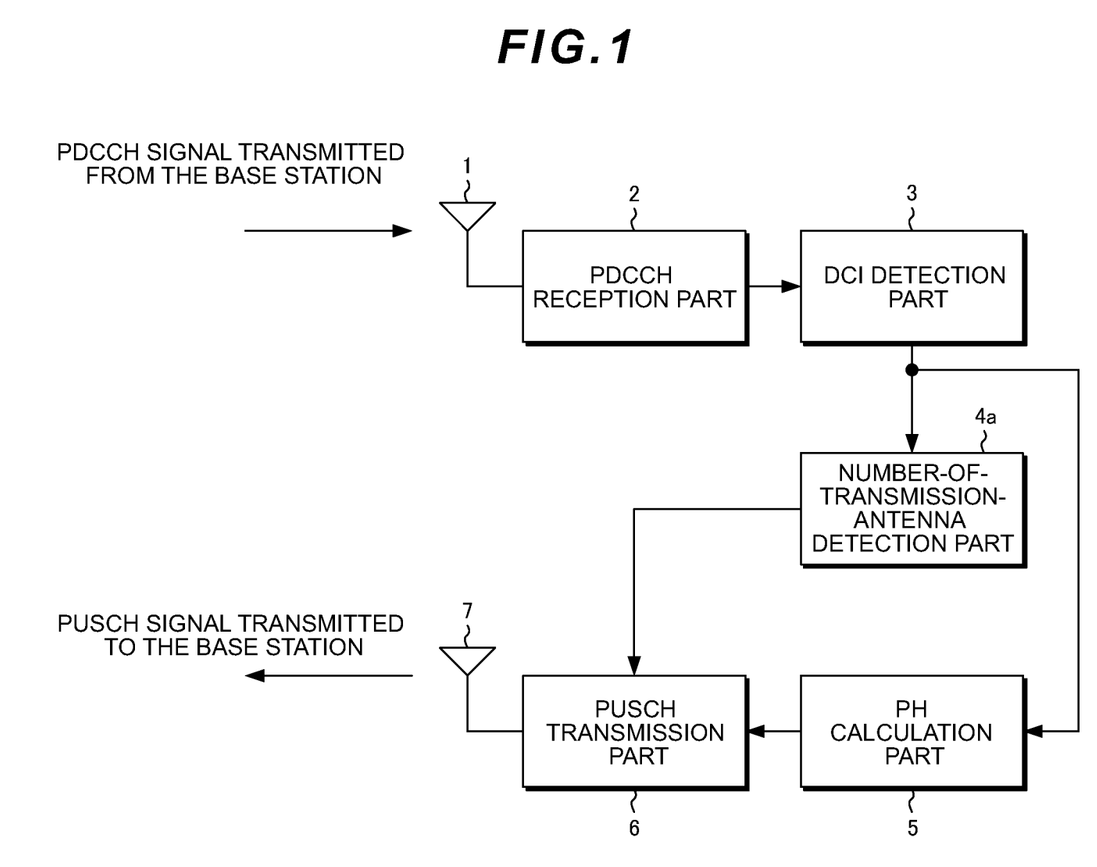
FIG. 1 is a block diagram illustrating a schematic configuration of a mobile station apparatus.

FIG. 1 is a block diagram illustrating a schematic configuration of the mobile station apparatus. In addition, FIG. 1 shows an example of a system in which the base station determines the number of antennas used by the mobile station based on the PH notified from the mobile station. The mobile station is comprised of a reception antenna 1, PDCCH reception part 2, DCI detection part 3, number-of-transmission-antenna detection part 4a, PH calculation part 5, PUCCH transmission part 6 and transmission antenna 7.

With respect to a PDCCH signal received in the reception antenna 1, the PDCCH reception part 2 detects bits concerning control information included in the signal, and the DCI detection part 3 detects a position of the frequency and transmission bandwidth assigned in uplink. At the same time, the number-of-transmission-antenna detection part 4a detects the number of transmission antennas multiplexed into the PDCCH to input to the PUSCH transmission part 6. Using the detected DCI, the PH calculation part 5 calculates the PH. The PH is expressed by $P_{max}-P_{tx}$ as a difference between the maximum transmission power of the mobile station and the transmission power required to achieve desired reception power in the base station. $P_{max}$ is the maximum transmission power of the mobile station, and for example, 23 dBm or the like. $P_{tx}$ is the transmission power that is originally required in consideration of path loss, shadowing, and the assigned transmission bandwidth, and a margin of power is larger as the difference is larger, while being smaller as the difference is smaller. Further, in the case that the difference is a negative number, the case means that desired reception power is not achieved. Using the number of antennas thus notified, the mobile station generates transmission signals from data according to the transmission scheme (for example, SC-FDMA) of the PUSCH, and concurrently transmits the signals from the transmission antenna 7.

In addition, the transmission antenna 7 is variable, and only a single antenna is shown in the figure, but actually transmission is performed using transmission antennas corresponding to the number of transmission antennas detected in the number-of-transmission-antenna detection part 4a. Further, the mobile station also notifies the base station of the calculated PH at timing designated from the base station or at certain intervals.

Figure 2:
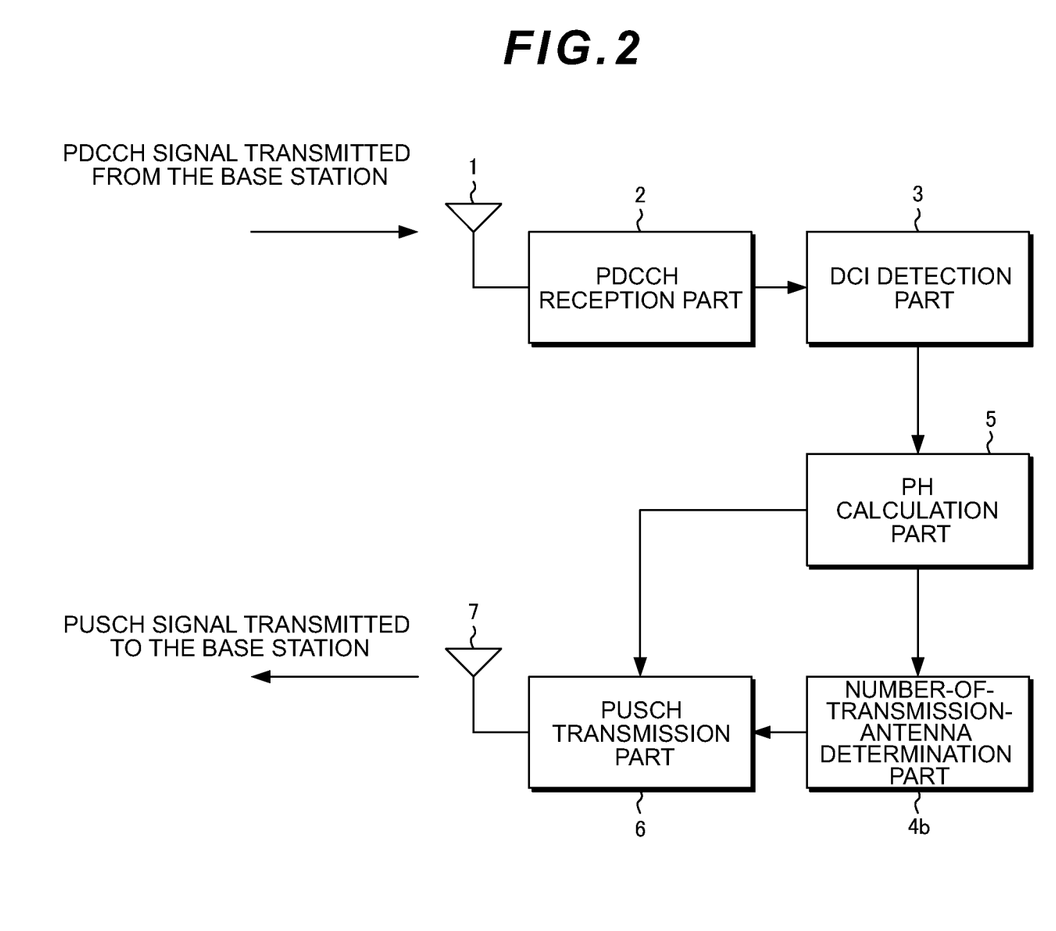
FIG. 2 is a block diagram showing another configuration example of the mobile station apparatus.

FIG. 2 is a block diagram showing another configuration example of the mobile station apparatus. FIG. 2 shows the case where the mobile station apparatus determines the number of transmission antennas independently. FIG. 2 differs from FIG. 1 in that the number-of-transmission-antenna determination part 4b determines the number of transmission antennas after calculating the PH. The other configuration is the same as in FIG. 1 and assigned the same reference numerals.

Figure 3:
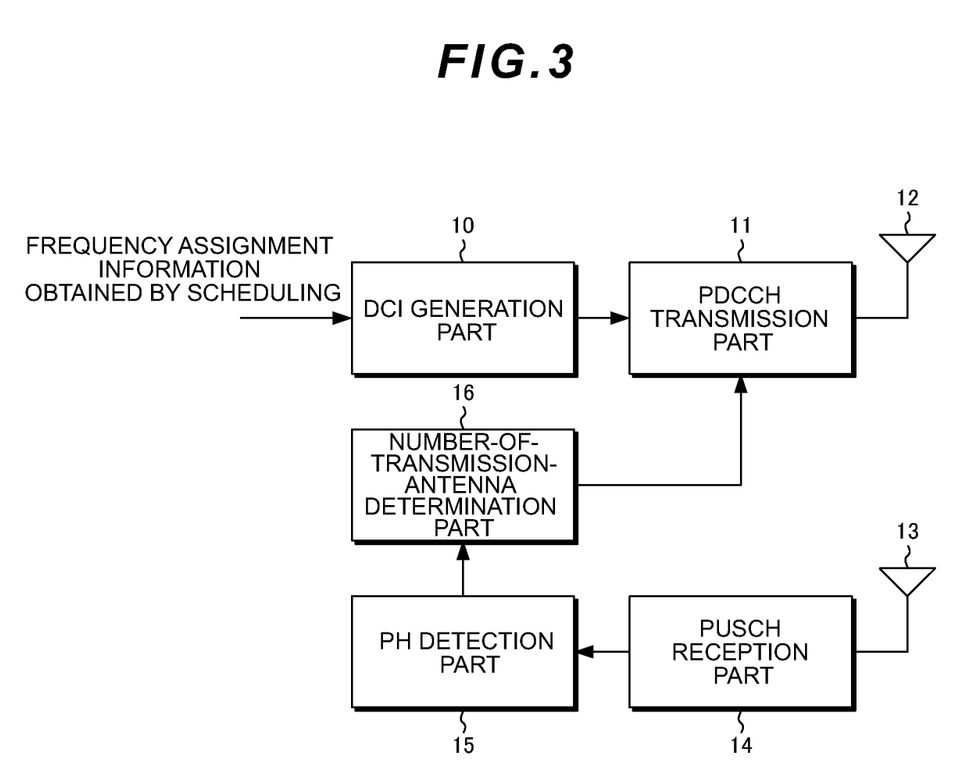
FIG. 3 is a block diagram illustrating a schematic configuration of a base station apparatus.

FIG. 3 is a block diagram illustrating a schematic configuration of the base station apparatus. FIG. 3 shows an example of a system in which the base station determines the number of antennas used by the mobile station based on the PH notified from the mobile station. The base station apparatus is comprised of a DCI generation part 10, PDCCH transmission part 11, transmission antenna 12, reception antenna 13, PUSCH reception part 14, PH detection part 15, and number-of-transmission-antenna determination part 16.

In the base station apparatus, the DCI generation part 10 generates DCI to notify from frequency assignment information determined by scheduling for determining the assignment frequency of each mobile station in uplink. The PDCCH transmission part 11 multiplexes the generated DCI as a PDCCH signal together with information on the number of transmission antennas obtained from the number-of-transmission-antenna determination part 16, and transforms the resultant into a transmission signal, and the signal is transmitted from the transmission antenna 12. Meanwhile, a PUSCH signal transmitted from the mobile station is received in the reception antenna 13, and the PUSCH reception part 14 detects a transmitted bit sequence. The PH detection part 15 detects the PH from the obtained bit sequence, and using the value, the number-of-transmission-antenna determination part 16 determines the number of transmission antennas to input to the PDCCH transmission part 11.

In addition, the case that the mobile station determines the number of transmission antennas independently is not shown, but has a configuration without the number-of-transmission-antenna part in FIG. 3.

Thus, by determining the number of transmission antennas to use corresponding to the PH, it is possible to perform suitable transmission using a plurality of antennas in consideration of power consumption. In addition, in the invention, the PH indicative of the transmission power is used, and further, the invention includes the cases of controlling using the transmission power and parameters calculated therefrom. Moreover, this configuration has a merit that the effect is not exerted on a protocol concerning notification of PH.

Embodiment 2

Embodiment 2 describes the case that a mobile station uses a plurality of transmission antennas (having independent transmission amplifiers) in a single system using SC-FDMA (DFT-S-OFDM) and Clustered DFT-S-OFDM.

R1-090020 that is a Non-patent Document describes a method of using SC-FDMA and Clustered DFT-S-OFDM separately using the transmission power as a criterion. In this Document, it is shown that Clustered DFT-S-OFDM is excellent in performance from the viewpoint of spectrum efficiency in the case of the center of the cell, etc. where the operation range of PA (Power Amplifier) has headroom i.e. high transmission power is not required, SC-FDMA having an advantage in PAPR performance is excellent in the case of a cell edge or the like that requires high transmission power and that it is possible to actualize high throughput by switching between the schemes.

Considering the case that a mobile station is capable of using a plurality of transmission antennas, the same effect as allowing the communication distance to be extended (allowing the reception power to be increased) can be expected by switching from Clustered DFT-S-OFDM to SC-FDMA and increasing the number of transmission antennas.

First, assuming that the PH is used for switching, the case is shown where PH, $P_{max}$ and $P_{tx}$ are calculated by the same calculation method as in a single antenna. In other words, it means that the value of $P_{max}$ does not change when the number of antennas increases. The following table shows changes in the communication scheme and the number of used antennas with change of the PH. In addition, to simplify the description, the maximum number of antennas is assumed to be "4".

TABLE 2

| PH | >a | a~b | b~c | c~d | d~e | e~f | f~g | ≤g |
|---|---|---|---|---|---|---|---|---|
| Method A | Cluster 1 | SC-FDMA 1 | Cluster 2 | SC-FDMA 2 | Cluster 3 | SC-FDMA 3 | Cluster 4 | SC-FDMA 4 |
| Method B | Cluster 1 | Cluster 2 | Cluster 3 | Cluster 4 | SC-FDMA 4 | | | |
| Method C | Cluster 1 | SC-FDMA 1 | SC-FDMA 2 | SC-FDMA 3 | SC-FDMA 4 | | | |

In the aforementioned table, the PH has the relationship of a>b>c>d>e>f>g which are different values in the method A, method B and method C. The upper stage in the table shows the communication scheme, and Cluster represents Clustered DFT-S-OFDM. The lower stage shows the number of antennas to use. The method A is a method for performing the finest control as compared with the methods B and C. Further, the method A and method C are of control for decreasing the number of used antennas as possible, and are control methods with consideration given to suppression of power consumption in the mobile station. The method B is a scheme to switch the communication scheme to Clustered DFT-S-OFDM as possible, and is a scheme with importance placed on spectrum efficiency mostly among three schemes.

Further, when the base station determines the communication scheme and the number of antennas, it is possible to apply transmission diversity. Furthermore, there is a method in which transmission diversity is not applied to Clustered DFT-S-OFDM, and is applied only to SC-FDMA.

Described next is the case where the base station determines the communication scheme, and the mobile station determines the number of used antennas. It is assumed that the base station switches the communication scheme when the value of PH is less than m (selects SC-FDMA) or the value is m or more (selects Clustered DFT-S-OFDM). The number of antennas is assumed to be n, and the mobile station calculates PH for each used antenna to determine.

The case is shown where as in the method B shown in above-mentioned table 1, the mobile station controls the number of antennas to use so that it is possible to design the system with spectrum efficiency increased as possible. The mobile station calculates required transmission power $P_{tx}$ required for communications. The PH (n, communication scheme) is calculated for each of antennas to use according to PH (n, communication)=Pmax (n, communication scheme)–Ptx. When n such that PH (n, Clustered DFT-S-OFDM) is m or more does not exist, the mobile station notifies the base station of PH (4, SC-OFDM) as the PH as feedback, and performs communications while setting the number of transmission antennas at 4. In other cases, the mobile station calculates PH (n, Clustered DFT-S-OFDM), selects the lowest n such that PH (n, Clustered DFT-S-OFDM)>0, notifies the base station of dummy data with the PH being a value of m or more, and performs communications while setting the number of antennas at n.

Herein, the reason why the dummy data of m or more is notified is to prevent the communication scheme designated by the base station from being changed by notification of the value because PH (n, Clustered DFT-S-OFDM) is less than m. Accordingly, when m=0 is set, it is not necessary to use the dummy data. By thus controlling, the base station does not need to control the number of antennas at all, many mobile stations select Clustered DFT-S-OFDM, and it is thereby possible to establish the communication system excellent in spectrum efficiency.

Described next is the case that the mobile station performs control so as to decrease the number of antennas to use as possible as in the method C shown in Table 1. The mobile station calculates required transmission power Ptx required for communications. The PH (n, communication scheme) is calculated for each of antennas to use according to PH (n, communication)=Pmax(n, communication scheme)–Ptx. When PH (1, Clustered DFT-S-OFDM) is m or more, the mobile station notifies the base station of PH (1, Clustered DFT-S-OFDM) as the PH as feedback, and performs communications while setting the number of transmission antennas at 1. When the PH (1, Clustered DFT-S-OFDM) is less than m, the mobile station calculates PH (n, SC-FDMA), selects the lowest n such that PH (n, Clustered SC^FDMA)>0, notifies the base station of dummy data with the PH being a value of m or less, and performs communications while setting the number of antennas at n. By thus controlling, the base station does not need to control the number of antennas at all, and the mobile station is capable of performing communications efficiently (with the minimum number of antennas).

Further, there is the case that the mobile station transmits known signals (SRS signals) once every several milliseconds in order for the base station to be able to grasp the channel state (frequency response) of the entire system band. In this case, when the mobile station updates the number of antennas at arbitrary timing, the channel states vary, and there is the case that it is not possible to grasp the channel states corresponding to the number of antennas to use at timing for performing communications. Therefore, as shown in this Embodiment, when the mobile station changes the number of antennas to use, the mobile station is beforehand set to change the number of antennas at timing after transmitting the SRS, and by thus controlling, it is possible to solve such a problem. Accordingly, timing occurs instantaneously at which the number of antennas to use in performing data communications is different from the number of antennas to transmit the SRS.

Meanwhile, with respect to a known signal (DRS) that is transmitted to enable the channel state (frequency response) of the band used in communications to be estimated, such a system is common that the DRS is transmitted in the same frame as in data communications, and therefore, the number of used antennas can be changed concurrently with data communications.

| | Description of Symbols |
|---|---|
| 1 | Reception antenna |
| 2 | PDCCH reception part |
| 3 | DCI detection part |
| 4a | Number-of-transmission-antenna detection part |
| 4b | Number-of-transmission-antenna determination part |
| 5 | PH calculation part |
| 6 | PUSCH transmission part |
| 7 | Transmission antenna |
| 10 | DCI generation part |
| 11 | PDCCH transmission part |
| 12 | Transmission antenna |
| 13 | Reception antenna |
| 14 | PUSCH reception part |
| 15 | PH detection part |
| 16 | Number-of-transmission-antenna determination part |

FIG. 1
PDCCH Signal Transmitted from the Base Station
2 PDCCH RECEPTION PART
3 DCI DETECTION PART
4a NUMBER-OF-TRANSMISSION-ANTENNA DETECTION PART
5 PH CALCULATION PART
6 PUSCH TRANSMISSION PART
PUSCH SIGNAL TRANSMITTED TO THE BASE STATION
FIG. 2
PDCCH Signal Transmitted from the Base Station
2 PDCCH RECEPTION PART
3 DCI DETECTION PART
4b NUMBER-OF-TRANSMISSION-ANTENNA DETERMINATION PART
5 PH CALCULATION PART
6 PUSCH TRANSMISSION PART
PUSCH SIGNAL TRANSMITTED TO THE BASE STATION
FIG. 3
Frequency Assignment Information Obtained by Scheduling
10 DCI GENERATION PART
11 PDCCH TRANSMISSION PART
14 PUSCH RECEPTION PART

15 PH DETECTION PART
16 NUMBER-OF-TRANSMISSION-ANTENNA DETERMINATION PART

The invention claimed is:

1. A mobile station apparatus which has two or more transmission antennas and performs wireless communications with a base station apparatus, the mobile station apparatus comprising:
 a PUSCH (Physical Uplink Shared Channel) transmission part configured to transmit data through changing the number of the transmission antennas to use; and
 a PH calculation part configured to calculate PH (Power Headroom) using a maximum transmit power of the mobile station apparatus and a transmit power to achieve requested reception power in the base station apparatus,
 wherein the PH calculation part is configured to calculate the PH using a predetermined value as the maximum transmit power of the mobile station apparatus, where the predetermined value in the case of transmitting by using the two or more transmission antennas is equal to the predetermined value in the case of transmitting by using a single transmission antenna, and
 wherein the PUSCH transmission part is configured to transmit the PH calculated.

2. The mobile station apparatus according to claim 1, wherein said PUSCH transmission part is configured to transmit data by switching between a method of continuously using a resource block as an access unit in a frequency domain and a method of distributedly using the resource block.

3. The mobile station apparatus according to any one of claims 1 and 2, wherein said PUSCH transmission part performs to communication with said base station apparatus using transmission diversity in a case where the changed number of transmission antennas is two or more.

4. A transmission method of transmitting data using two or more transmission antennas, the transmission method comprising:
 transmitting PUSCH (Physical Uplink Shared Channel) for transmitting data through changing the number of transmission antennas to use; and
 calculating PH (Power Headroom) using a maximum transmit power of the mobile station apparatus and a transmit power to achieve requested reception power in a base station apparatus,
 wherein the PH is calculated using a predetermined value as the maximum transmit power of the mobile station apparatus, where the predetermined value in the case of transmitting by using the two or more transmission antennas is equal to the predetermined value in the case of transmitting by using a single transmission antenna, and
 wherein transmitting the PH calculated.

\* \* \* \* \*